Oct. 13, 1959   R. T. LOGAN   2,908,405
MECHANISM FOR THE OPERATION OF THE TRANSFER TABLE OF A PRESS
Filed May 1, 1958   7 Sheets-Sheet 2
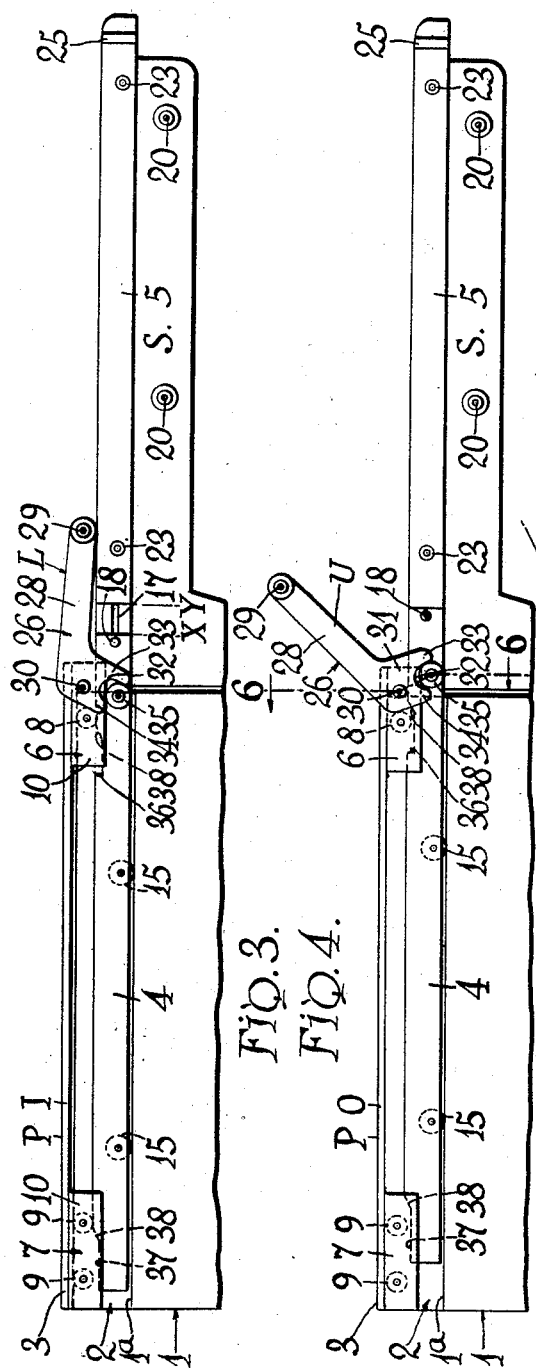
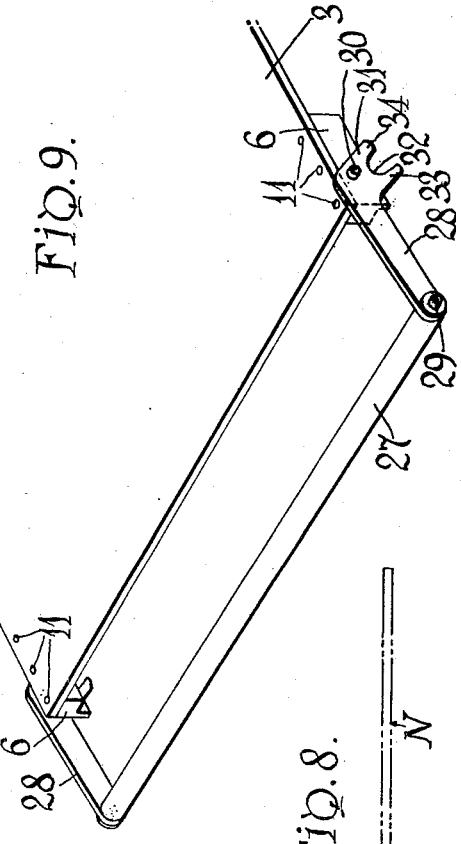
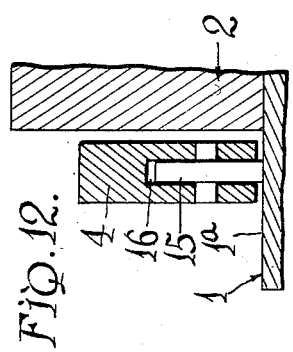
INVENTOR.
Robert T. Logan,
BY
ATTORNEY.

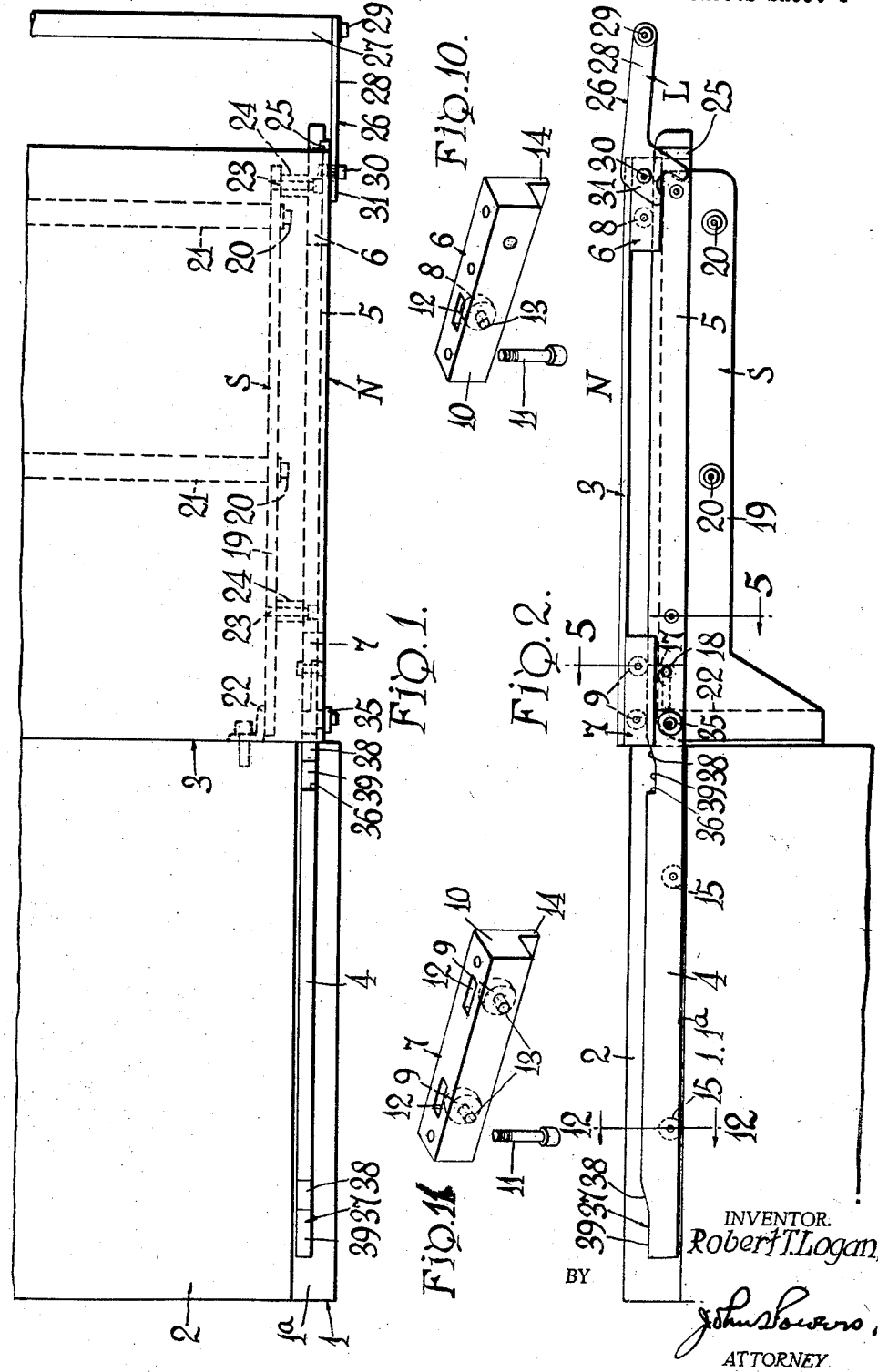

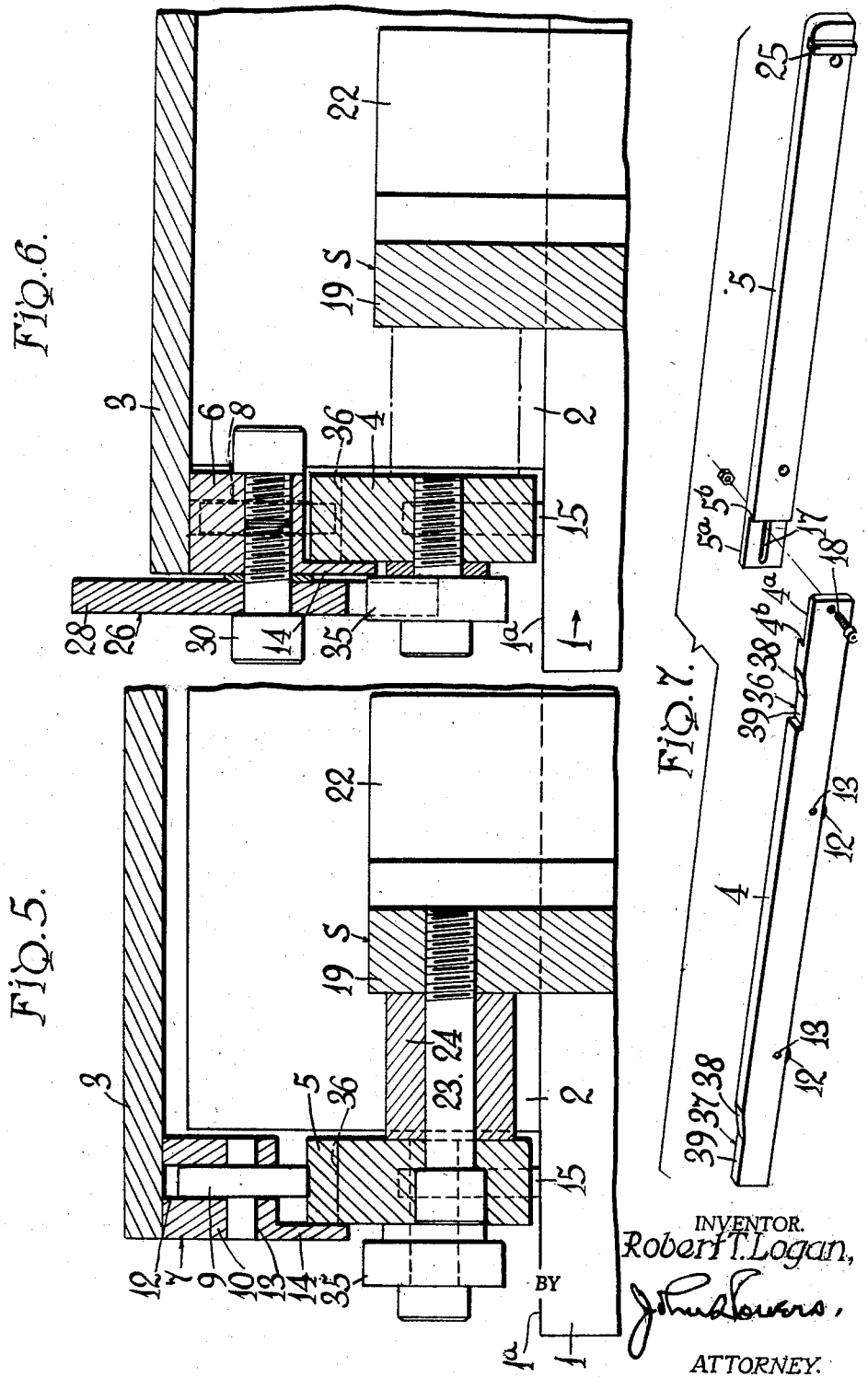

Oct. 13, 1959   R. T. LOGAN   2,908,405
MECHANISM FOR THE OPERATION OF THE TRANSFER TABLE OF A PRESS
Filed May 1, 1958   7 Sheets-Sheet 4
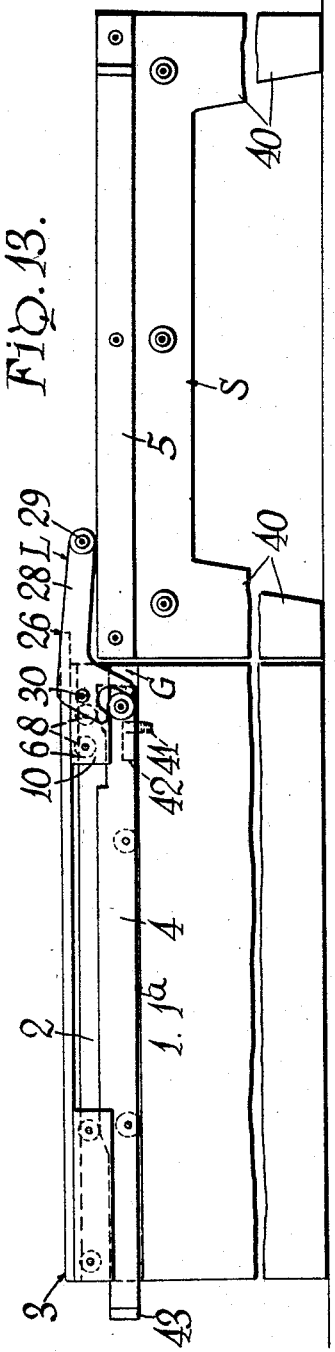
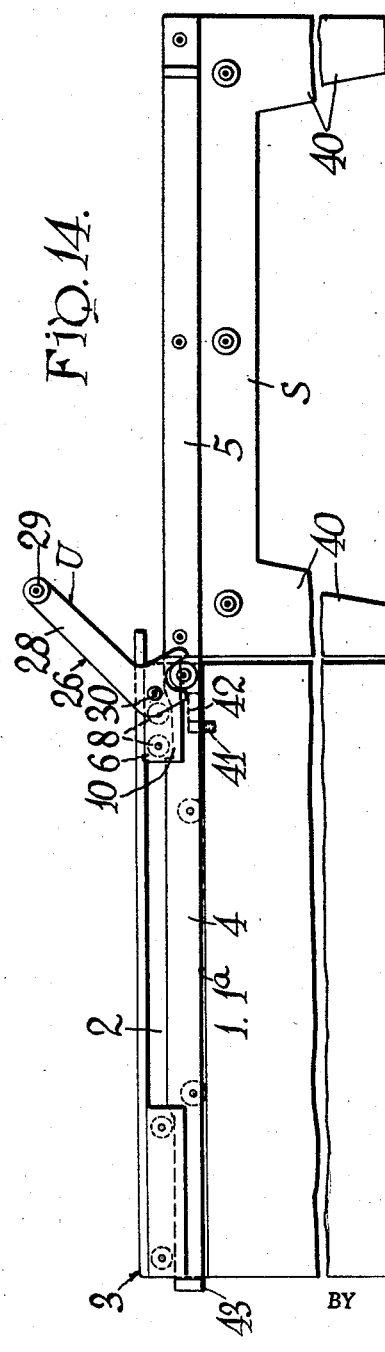
INVENTOR.
Robert T. Logan,
BY
John Lowers,
ATTORNEY.

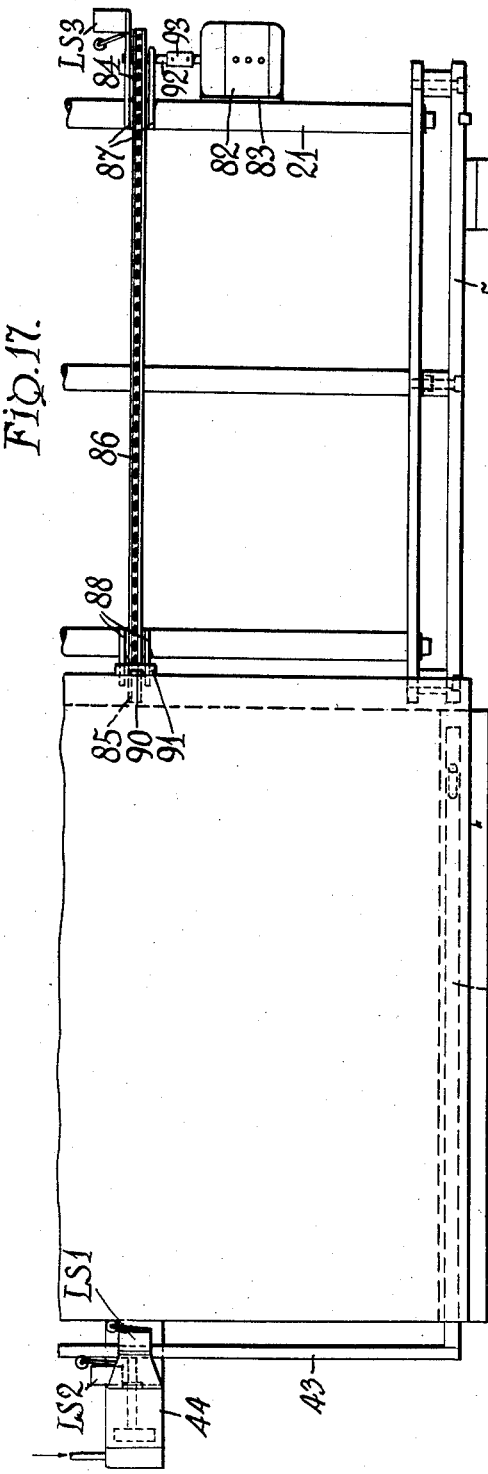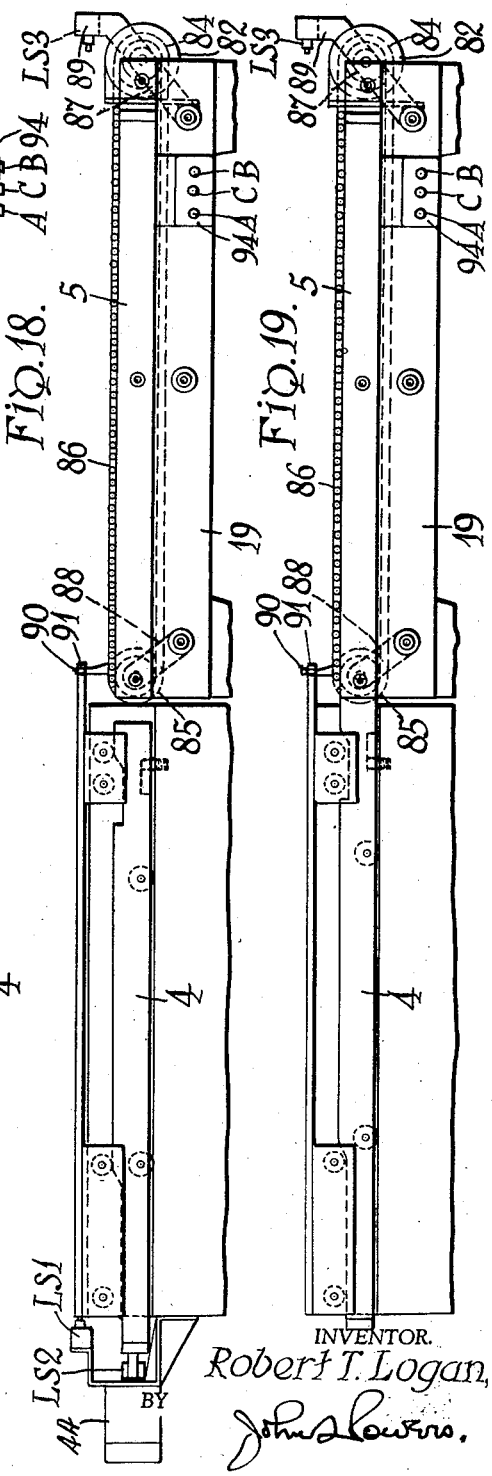

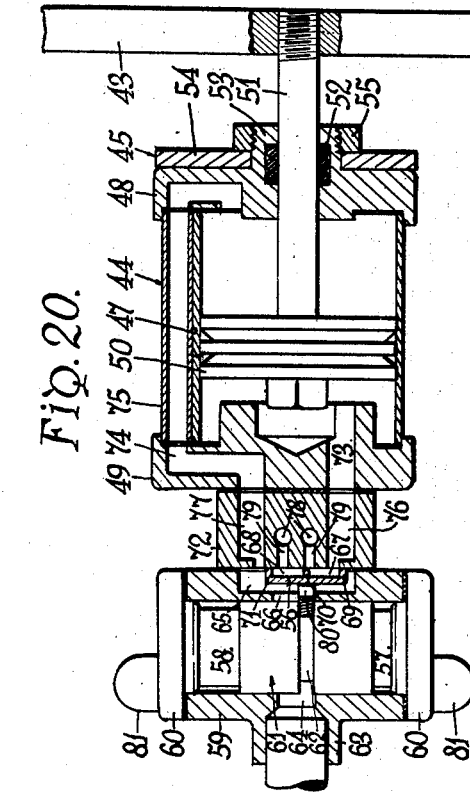

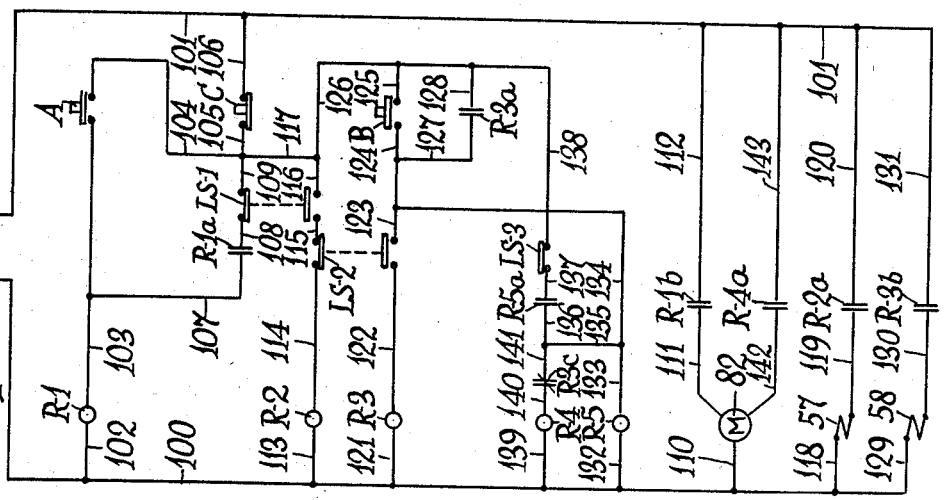
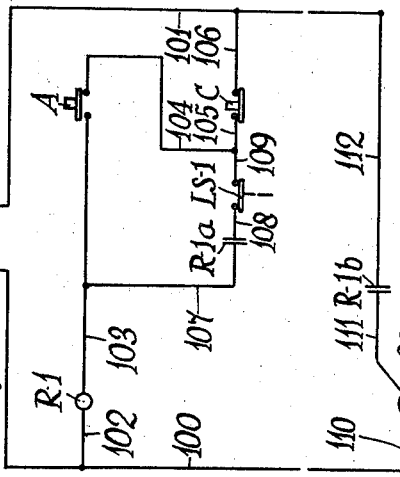
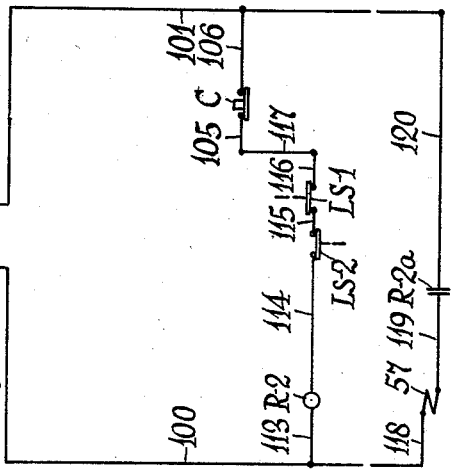
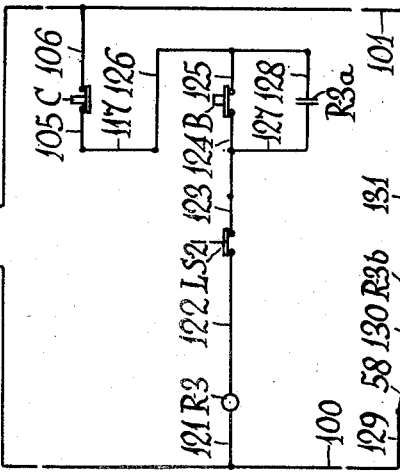
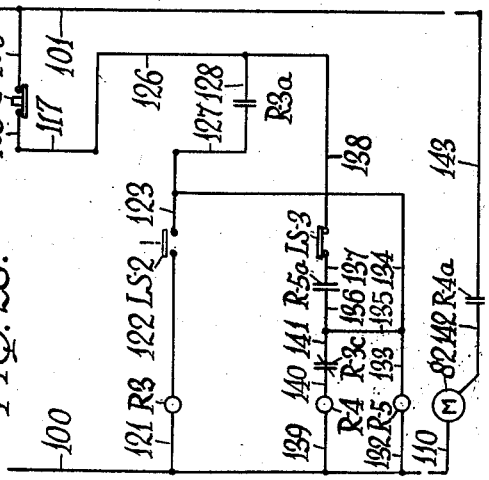

United States Patent Office 2,908,405
Patented Oct. 13, 1959

2,908,405

MECHANISM FOR THE OPERATION OF THE TRANSFER TABLE OF A PRESS

Robert T. Logan, North Tonawanda, N.Y.

Application May 1, 1958, Serial No. 732,378

14 Claims. (Cl. 214—1)

In certain precision operations required to be performed by presses a plate, removably mounted upon the lower platen of the press, is employed in cooperative relation with an overlying table, known as a "transfer table," which supports the material or object to be processed and is movable between a positive position in which it is located between the platens of the press and a negative or inactive position in which it is supported upon a stand located at one side of the press. In the negative position of the table the material or object that has been processed is removed and the material or object requiring processing is positioned. According to the particular precision operation required the plate may be heated or chilled to a particular determined temperature or left at room temperature and the table which, in its operative position, rests upon the plate has a temperature transmitted to it by the plate. For the purpose of its movement between its positive and negative positions the table is supported in spaced relation to the plate. As brought to its positive position the table also has movements toward and from the plate, that is to say between the position in which it is immediately above the plate and which may be called its inoperative position and a position in which it rests upon the plate and which may be called its operative position. The upper face of the plate and the lower face of the table are adjacent and for the purpose of the required precision operations are each machined within limits of close tolerance. In the constructions heretofore used the movements of the table between its inoperative and operative positions have included a horizontal component effected to some extent after the initial contact between the adjacent machined faces of the table and the plate in the movement of the table to its operative position. In the intervals between the operations of the press the air-carried dust or grit of the press room is deposited upon the upper machined face of the plate. Due to the horizontal component of the movement of the table to its operative position and to the weight of the table and the subject to be processed which in most cases runs to hundreds of pounds and in some instances is between one and two tons the machined adjacent faces of the table and the plate after a period of repeated use become scuffed to an extent which renders nugatory the intended value of their machined finish and also seriously impairs the required precision of the contemplated press operation.

This invention relates to mechanism for the operation of the transfer table of a press in effecting its movements between the above described positive and negative positions and operative and inoperative positions. The press may be of any known construction having opposed upper and lower platens, either of which may be stationary and the other movable.

The object is to provide a transfer table operating mechanism of simple structural character which may be actuated rapidly and with facility manually or automatically, e.g., electrically, which may be used with presses wherein the upper platen is stationary and the lower platen moves upward or wherein the lower platen is stationary and the upper platen moves downward, and which insures movements of the table between its inoperative and operative positions of such character that the adjacent machined faces of the table and the plate will have no relative movement after their contact is established and hence will not be subject to scuffing by dust or grit which may have been deposited upon the surface of the plate, such dust or grit being so fine that it does not intrinsically affect the required precision of the contemplated operation.

The combination of elements which constitutes the invention includes front and rear wheeled carriages carried by the table, supporting rails adjacent the plate and platen and upon which the wheels of the carriages track, the mounting of the rails for longitudinal advancing and return movements within definite limits, the formation of the rails to provide, in their cooperation with the carriages, for rectilinear movements of the table between its inoperative and operative positions, and means operative in the positive position of the table for effecting the advancing and return movements of the rails, these movements effecting the movements of the table to its respective operative and inoperative positions. The construction wherein the table is moved manually may be used where the length of the table does not exceed four feet and the combination of elements includes a handle feature functionally connected to the table and having pivoted arms which, at a stage of the operation, function as levers and, so functioning, are formed for cooperation with elements carried by the rails to effect the movements of the rails. The construction wherein the table is moved by electrically operated elements is recommended where the length of the table exceeds four feet, the tables in some instances having a length of ten feet and a weight of the order of a thousand pounds. In the electrically operated construction the combination of elements includes mechanism automatically operative at the required stages for effecting the movements of the rails.

Where the subject to be processed is not too heavy and the lower platen is movable the stand may be carried by the lower platen and participates in its upward and downward movements. In other cases the stand may be floor supported in a fixed position.

The features of the mechanism are duplicated at the opposite longitudinal sides of the table. Hence in the drawings the invention is sufficiently illustrated by the showing of its features at one side of the table. The press forms no part of the invention and may be of any well known construction, hydraulic or otherwise, which has opposed relatively movable platens. Hence, except for the lower platen and the plate required for certain precision operations, the parts of the press are not shown.

In the drawings:

Figures 1 to 12 show a construction wherein the table is moved manually and the stand is attached to the lower platen.

Figure 1 is a plan view with the table in its negative position.

Figure 2 is a corresponding side elevation.

Figure 3 is a side elevation with the table in its positive and inoperative positions.

Figure 4 is a side elevation with the table in its positive and operative positions.

Figure 5 is a transverse sectional view on the line 5—5 of Figure 2.

Figure 6 is a transverse sectional view on the line 6—6 of Figure 4.

Figure 7 is an exploded perspective view of a movably mounted supporting rail at one side of the table and an associated stationary rail which is a part of the stand.

Figure 8 is a schematic diagram showing the several positions of the table.

Figure 9 is a perspective view showing the manual actuating feature.

Figure 10 is a perspective view of one of the two carriages at the front end of the table.

Figure 11 is a perspective view of one of the two carriages at the rear end of the table.

Figure 12 is a detail transverse sectional view on the line 12—12 of Figure 2.

Figures 13 to 16 show a construction wherein the table is moved manually and the rails which form part of the stand are terminally spaced from the coplanar movable rails.

Figure 13 is a side elevation showing the relationship of the parts with the table in its positive and inoperative positions.

Figure 14 is a side elevation showing the relationship of the parts with the table in its operative position.

Figure 15 is a perspective view of a front carriage of the table.

Figure 16 is a perspective view of a rear carriage of the table.

Figures 17 to 29 show a construction in which the movements of the transfer table are effected by electrically operated elements.

Figure 17 is a plan view with the table in its positive and inoperative position.

Figure 18 is a side elevation corresponding to Figure 17.

Figure 19 is a side elevation with the table in its positive and operative position.

Figure 20 is a central longitudinal sectional view in a horizontal plane showing means for effecting the movements of the rails with resultant vertical rectilinear movements of the table.

Figure 21 is an elevation of a limit switch, three of which are employed.

Figure 22 is a partial plan view on an enlarged scale showing certain elements which are operated in connection with the vertical rectilinear movements of the table.

Figure 23 is a partial side elevation corresponding to Figure 22.

Figure 24 is a composite wiring diagram showing all of the circuits (in broken condition) involved in effecting the movements of the table.

Figures 25 to 29 are wiring diagrams showing the several individual circuits included in Figure 24.

Figure 25 shows the circuit of the motor in effecting the movement of the table from its negative to its positive inoperative position.

Figure 26 shows the circuit of the solenoid for effecting a movement in one direction of a valve which prescribes a direction of air flow and is a part of the mechanism for moving the rails which effect the vertical rectilinear movement of the table.

Figure 27 shows the circuit of the solenoid which controls the air flow to the piston for effecting a movement in the opposite direction of the air flow control valve.

Figure 28 shows the circuits which control the operation of the motor for the movement of the table from its positive inoperative position to its negative position.

Figure 29 shows the circuits of Figure 28 as broken when the table reaches its negative position.

Referring to Figures 1 to 12:

The press has the usual lower platen 1 and the usual upper platen (not shown). One of the platens is movable toward and from the other and either platen, in accordance with known press construction, may be the movable platen, the cooperating platen being stationary. Figures 1 to 12 assume a press wherein the lower platen is movable. The platen 1 is the support for the article or material to be processed. For certain precision work a plate 2 having its upper face machined is removably mounted upon the lower platen and is maintained, according to the particular operation required, at a determined temperature which may require its heating or chilling or which, in some instances, may be room temperature, the provision of the plate 2 and its temperature determination being in accordance with established practice. The subject to be processed (an article or material) is directly supported upon a table 3 having its lower face machined and shown in Figures 3 and 4 in a positive position P between the platens and in Figures 1 and 2 in a negative position N beyond the platens. The table 3 in its positive position P also has, as shown in Figure 3, an inoperative position I in which it is spaced above the plate 2 and, as shown in Figure 4, an operative position O in which it rests upon the plate 2. These several positions are shown schematically in the diagram of Figure 8. In its negative position N the table 3 is supported upon a stand S located at one side of the press as shown in Figure 2.

In its movements between its positive and negative positions the table 3 travels upon alining rails 4 and 5, the rails 5 being parts of the stand S, the rails 4 being adjacent the opposite sides of the plate 2, being movable in the direction of their longitudinal planes and in their movement governing the movements of the table 3 between its positions I and O when in its position P.

The drawings being considered, the right and left ends of the table 3 may be designated, respectively, as its front and rear ends. For the purposes of its movements upon the rails 4 and 5 the table 3 is directly supported by a series of attached carriages, preferably in depending relation, and arranged in front and rear pairs 6 and 7 respectively, each carriage 6 (in the embodiment of Figures 1 to 12) having a single roller 8 and each carriage 7 having two rollers 9, the rollers 8 and 9 tracking upon the rails 4 and 5. Each carriage 6 and 7 includes a mounting block 10 attached to the table by screws 11, the blocks having vertical openings 12 (Figures 10 and 11) to accommodate the associated rollers and horizontal openings 13 to accommodate the mounting pins of the rollers. The several blocks 10 are formed at their outer sides with downwardly extending flanges 14 which adjoin the outer side faces of the rails 4 and 5 and thereby hold the table 3 against lateral displacement. In the embodiments shown there are but two pairs of carriages. It will be understood, however, that the length of the tables may be such that more than two pairs of carriages may be required.

As herein shown the plate 2 is of less transverse dimension than the platen 1 which, therefore, has lateral portions 1a beyond the sides of the plate 2. The rails 4 are adjacent the sides of the plate 2 and are provided with rollers 15 which track upon the projecting parts 1a of the platen 1, the rollers 15 being mounted in recesses 16 (Figure 12) formed in the rails 4 and open to the lower faces of the rails.

The stand S (Figures 1 and 2) includes parallel frame bars 19 connected by cross rods 21 suitably attached to the bars 19, e.g., by end fastenings 20, the bars 19 extending laterally from the platen 1. The rails 5 are parallel to, and spaced outwardly from, the bars 19, each rail 5 being connected to an adjacent bar 19 by bolt fastenings 23 upon which are fitted spacing sleeves 24. The rails 5 are provided at or near their outer ends with outwardly projecting lugs 25 which serve as stops to limit the advancing movement of the table 3 to its position N, the lugs 25 in their stop functions being engaged by the flanges 14 of the carriages 6.

In press constructions wherein the lower platen is the movable platen the stand S may be platen supported or floor supported. Figures 1 and 2 show the stand S as platen supported, the stand participating in the upward and downward movement of the platen 1 and being attached to the platen by bolt and bracket fastenings 22, the brackets being conveniently of angle iron section and secured, as by welding, to the inner end portions of the bars 19.

In the construction wherein the stand S is platen supported, the rails 4 and 5 at each side of the plate 2 have adjacent end portions 4a and 5a respectively (Figure 7) which are of reduced thickness and extend in overlapping relation from shoulders 4b and 5b respectively, the rail portion 5a being formed with a longitudinal slot 17 and the rail portion 4a being provided with a transverse pin 18 which projects through the slot 17. The rails 4 are shown in their normal or return position in Figure 3 and in their advanced or operative position in Figure 4. In Figure 3 the line X is indicative of the limit of return movement of the rails 4 and the line Y is indicative of the limit of the advancing movement of the rails 4, the extent of such movement in either direction therefore being the distance between the lines X and Y. The return movement of the rails 4 to their normal position is limited by the engagement of the pins 18 with the rear ends of the slots 17. The advancing movement of the rails 4 to their operative position is limited by engagement of the front ends of the rails 4 against the shoulders 5b and of the rear ends of the rails 5 against the shoulders 4b.

The movements of the table 3 between its positions P—I and N are planar movements and in the construction shown in Figures 1 to 12 are effected by a handle 26 which includes a cross bar 27 (Figure 9) serving as a hand grip and arms 28 extending outward from the table 3, the cross bar 27 being secured by fastenings 29 to the outer ends of the arms 28. The arms 28 adjoin the outer sides of the table 3 to which they are functionally connected at their inner ends by pivot pins 30, directly attached to the blocks 10 of the carriages 6. As thus mounted the handle 26 has two positions, namely, a lower position L as shown in Figures 1, 2 and 3 and a raised position U as shown in Figure 4. The movement of the table 3 between its positions P—I and N is effected with the handle 26 in its lower position L, the table 3 being pulled from its position P—I to its position N and being pushed from its position N to its position P—I.

Each arm 28 is formed at its rear end with a projection 31 which extends downward from the pivot 30 and is bifurcated to provide a marginal recess 32 extending between front and rear tines 33 and 34. The recess 32 and the tines 33 and 34 which provide its walls function as a cam in the movement of the arms 28 about the pivots 30 and are in cooperation with a roller 35 as a companion element, the roller 35 being carried by the corresponding rail 4 at its outer side and near its front end.

In the position L of the handle 26 the tines 34 clear the rollers 35 and the handle may be used to effect the free movement of the table 3 between its positions P and N. Assuming the table 3 to be in its position N (Figures 1 and 2), at which time the rails 4 are in position X, the handle 26, in its position L, is grasped and the table is pushed back to its position P (Figure 3) at which time, its return movement being completed and the rails 4 remaining in position X the while, the rollers 35 are in registry with the recesses 32. Thereupon the handle 26 is moved from its position L (Figure 3) to its position U (Figure 4) and in such movement the tines 34 advance the rails 4 from their position X to their position Y. This upward movement of the handle 26 with resultant advancing movement of the rails 4 effects the positioning of the table 3 upon the plate 2 (position P—O) at which time the press is operated to process the subject (article or material), the handle 26 remaining in its position U during the processing operation. When the processing has been completed and the press platens are restored to their normal relative positions the handle 26 is moved back from its position U to its position L and the tines 33 by engagement with the rollers 35 move the rails 4 back to their original position X, the table 3 thereby being moved from its position P—O to its position P—I. When these relations have been established, the handle 26 being then in its position L, the table 3 is pulled by means of the handle 26 from its position P—I to its position N in which it is supported by the stand S, the processed subject being thereupon removed and a subject to be processed being placed upon the table at which time the operations above described are repeated.

The rails 4 are formed along their upper faces with front and rear recesses 36 and 37 (Figures 2, 3, 4 and 7) for cooperation respectively with the rollers 8 and 9 of the carriages 6 and 7. If more than two pairs of carriages be required it will be understood that corresponding recesses similar to the recesses 36 and 37 will be formed along the upper faces of the rails 4. The recesses 36 and 37 at corresponding ends have downwardly inclined cam faces 38 which extend from the upper faces of the rails to horizontal dwells 39, the downward extent of the faces 38 of the several recesses being in the same direction. In the embodiment shown the cam faces 38 extend rearward, i.e., the drawings being considered, to the left. The rails 4 being in their position X when the table 3 is moved from its position N to its position P—I one or the other of the two rollers 9 of the carriages 7, by reason of their mutual spacing, will support the rear end of the table 3 from the upper faces of the rails 4 during the movement of the carriage 7 across and beyond the recesses 36. The pin 18, functioning as a stop, will limit the return movement of the table 3 to a position (Figure 3) in which the rollers 8 and the foremost rollers 9 will remain upon the upper faces of the rails 4. At this stage the handle 26 is moved from its position L to its position U and, as above explained, the rails 4 are advanced to their position Y. As a result of such advancing movement the cam faces 38 will pass beyond the rollers 8 and the foremost rollers 9 and thereby effect the lowering, in a rectilinear movement, of the table 3 to its position P—O (Figure 4) in which it is supported upon the plate 2, the adjacent machined faces of the plate 2 and the table 3 being in uniform contact. When the handle 26, following the processing operation, is moved from its position U back to its position L the rails 4, as above explained, will be returned to their position X. As a result of such return movements the cam faces 38 will act upon the rollers 8 and the foremost rollers 9 and thereby effect the raising, in a rectilinear movement, of the table 3 to its position P—I in which it is spaced above the plate 2 in readiness for its movement from its position P to its position N.

Referring to Figures 13 to 16:

In these figures the stand S is floor supported by means of legs 40. The lower platen 1 is assumed as either stationary or, if movable, in its normal lowered position. With a stationary lower platen, and alike with a movable platen in its lowered position, the rails 4 and 5 are mutually spaced in coplanar relation, gaps G intervening between them. The manual actuating means is of the construction shown in Figures 1 to 12 and includes the handle 26 with its arms 28 pivotally connected by the pins 30 to the blocks 10 of the carriages 6. The carriages 6 instead of a single roller 8 have two rollers 8 whereby in the movements of the table between its positions P—I and N the gaps G are bridged and the front end of the table 3 at all times has stable support from either of the associated rails 4 or 5 as the case may be. In this manually actuated construction wherein the coplanar rails 4 and 5 are discontinuous the means for limiting advancing and return movements of the rails 4 comprises in the instance of each rail 4 a pin 41 carried by and projecting upward from the platen parts 1a and engaging in a recess 42 in the under face of the corresponding rail 4, the end walls of which provide stop shoulders. At their rear ends the rails 4 are preferably tied together by a cross bar 43. In other respects the construction is similar to the construction shown in Figures 1 to 12.

Referring to Figures 17 to 29:

The construction shown in these figures involves the automatic operation of the table 3 by a system of electrical control. As in the constructions shown in Figures 1 to 16 the table 3 has the same positions and movements represented in the diagram of Figure 8, that is to say, the positions P—I, P—O and N and movements between the positions P—I and N and the positions P—I and O. The system of automatic operation is recommended where the tables are relatively long and heavy, e.g., in excess of four feet in length, the weight of the table, of course, increasing with its length and in some cases running as high as the order of one thousand pounds.

In this construction the rails 4 have the same relation to the table and to platen 1 as in the manually operated construction and the same relation to the rails 5 as parts of the stand S which, of course, is floor supported. As in the construction shown in Figures 13 and 14 the rails 5 are spaced somewhat from the corresponding aligning rails 4 which are connected at their rear ends by the cross bar 43.

It will be understood that in cases where the length and weight of the table may be such that one or more intermediate pairs of carriages (illustration of which is deemed unnecessary) may be advisable the carriages of each intermediate pair will have two rollers, similar to the rollers 9 of the carriages 7 (Figure 16), and the rails 4 will be formed with cam recesses 37 corresponding to the intermediate carriages and located according to the positions of the intermediate carriages along the length of the table.

Various electrically controlled devices are available for connection to the bar 43 to effect the advancing and retractile movements of the rails 4. The device selected for illustration is a unit 44 (Figure 20) of well known construction which may be purchased from electrical supply houses and which includes a fluid pressure motor, a valve movable between two positions, its particular position effecting the admission of air to one end or the other of the cylinder of the fluid motor, and opposed solenoids for effecting the movements of the valve. The unit 44 is shown schematically in Figures 17 and 18 and in detail in Figure 20. The unit 44, together with other associated parts to be later described, is supported from the rear end of the platen 1 by a vertical bracket 45 (Figure 23) formed at its lower end for attachment, as by fastenings 46, to the platen 1 adjacent its rear face.

The fluid pressure motor of the unit 44 includes a cylindrical casing 47 having inner and outer end heads 48 and 49 respectively, a piston 50 and a piston rod 51 attached to the piston 50, extending through the end head 48, and attached to the cross bar 43. The stuffing box feature 52 for the rod 51 is enclosed within a collar 53 formed on the head 48 and which may be utilized for the attachment of the unit 44 to a vertically extending part 54 of the bracket 45. The part 54 has an opening to accommodate the collar 53, the projecting part of which is threaded to carry a securing nut 55 which is tightened against the part 54 and in cooperation with the head 48 acts clampwise to secure the unit 44 in rearwardly projecting relation to the bracket 45.

Air is admitted sequentially to the opposite ends of the cylinder 47 to effect reciprocation of the piston 50. The air admission and exhaust is governed by a solenoid operated slide valve 56. The valve 56 is operated by two opposed alining solenoids 57 and 58 which, in Figure 20, are sufficiently indicated by the showing of their casings (the solenoid coils being shown in the wiring diagrams later to be described). The solenoids are mounted in a valve box 59 closed at its ends by caps 60 to which the solenoid casings are attached. The solenoid armatures (not shown) govern the reciprocation axially of the valve box 59 of a floating piston 61 having a centrally located annular channel 62. The box 59 is provided with an air inlet collar 63 connected to a compressed air supply (not shown) and communicating in any position of the piston 61 by a port 64 with the channel 62. The inner wall of the valve box is formed with a recess 65 open to the outer face of the wall and at all times communicating by a port 66 with the channel 62. The slide valve 56 is arranged within the recess 65 for reciprocatory movement, the walls of the recess providing guides. The outer face of the valve 56 is dished or recessed to provide channels 67 and 68 and projections 69, 70 and 71, respectively. The valve 56, according to its position, determines the air flow circuits and in this capacity cooperates with a block 72 arranged between the valve box 59 and the outer head 49 of the cylinder 47, the block having gasket sealed attachment to these parts and thereby providing support for the valve box. The projections 69, 70 and 71 extend beyond the face of the valve box sufficiently to compensate for the thickness of the sealing gasket and during the sliding movements of the valve bear in substantially sealed relation upon the adjoining face of the block 72. The cylinder head 49 is provided with a passage 73 which communicates with the cylinder 47 at its rear end and with a passage 74 which communicates by means of a pipe 75 with the cylinder 47 at its front end. The block 72 is provided with passages 76 and 77 which are at all times in communication with the respective passages 73 and 74 of the cylinder head 49. In one position of the valve 56 the passage 76 communicates with the channel 67 and in the other position the passage 77 communicates with the channel 68. The block 72 is formed with two parallel air exhaust passages 78 discharging to atmosphere. The passages 78 communicate by corresponding passages 79 with the respective channels 67 and 68. The movements of the floating piston 61 are directly communicated to the slide valve 56 whereby these two parts are movable as a unit. The valve 56 has upon its outer face a centrally located lug 80 and is biased into strong contact with the face of the block 72 by a spring fitted in the channel 62 and bearing upon the lug. The floating piston 61 carries within the channel 62 a radially projecting pin (not shown) which has a socketed relation in the lug 80 and transmits the movement of the piston 61 to the valve 56. The solenoid electric wiring passes through the caps 60, the contact connections being protected by cup-like casings 81 of insulating material mounted on the caps.

In Figure 20 the positions of the parts assume that the rails 4 are retracted and that the table 3 is in its position P—I, the valve 56 being shown as having been positioned by the energization of the solenoid 57 for the delivery of air under pressure through the passage 74 and the pipe 75 to the front end of the cylinder 47 and the piston 50 being shown in its position at the rear end of the cylinder 47. With the table 3 in its position P—I its next movement may be to either of its positions P—O or N. Assuming that the next movement of the table 3 is to its position P—O the immediately following operation is the energization of the solenoid 58 and the positioning of the valve 56 for the admission of air into the rear end of the cylinder 47 through the passage 73 and the movement of the piston 50 toward the front end of the cylinder 47 with resultant advancing movement of the rails 4 and the lowering of the table to its position P—O. When the table is in its position P—O the subject is processed and when, following the processing operation, the platens are again in their normal relation, the table 3 is moved by the energization of the solenoid 57 back to its position P—I, the parts thereupon again being in the relation shown in Figure 20 and in readiness for the movement of the table 3 to its position N.

As herein shown the movements of the table 3 between its positions P—I and N are effected by a reversible electric motor 82 (Figure 17) having a supporting base 83 rigidly connected, as by welding, to the cross bar 21 at the front end of the stand S. The motor 82 is connected by suitable gearing to the table 3, the gearing selected for illustration consisting of front and rear sprockets 84 and 85 (Figures 18 and 19) and a chain 86 trained over the sprockets. The sprockets 84 and 85 are carried by front and rear pairs of arms 87 and 88 which are rigidly secured as by welding to the front and rear cross bars 21 of the stand S. The sprockets 84 and 85 and the chain 86 preferably have a central location relatively to the table 3. One of the front arms 87 has an upward extension 89 which carries a limit switch later to be described. The operative connection between the chain 86 and the table 3 consists of an upright post 90 carried by the chain and extending somewhat loosely through an opening provided by a bracket 91 attached to the front edge face of the table 3. The shaft 92 of the sprocket 84 is in alinement with the shaft of the motor 82 to which it is connected in driven relation by a separable coupling 93. The motor 82 as operated in one direction causes the post 90 to pull the table 3 from its position P—I to its position N and as operated in the reverse direction causes the post 90 to push the table 3 from its position N to its position P—I. The operation of the motor 82 in one direction is initiated by a push button switch A and in the opposite direction by a push button switch B. The casing 94 of the switches A and B may be mounted in any convenient location, for example upon one of the bars 19, and may enclose a normally closed "emergency" push button switch C so located in the several circuits which control the movements of the table 3 that when operated it breaks the particular circuit, whatever it may be, which at the time was operative for a particular movement of the table 3.

An appropriate wiring system is shown compositely in the diagram of Figure 24 and as to its several circuits which effect particular movements of the table 3 in the diagrams of Figures 25 to 28. The wiring system includes five electromagnetic contactors, the coils of which are distinguished in Figure 24 as R–1, R–2, R–3, R–4 and R–5. The coil of each contactor controls the engagement or disengagement of one or more pairs of associated contacts. In the wiring diagrams the pairs of contacts under the control of the several coils are distinguished as R–1a and R–1b (under the control of the coil R–1), R–2a (under the control of the coil R–2), R–3a, R–3b and R–3c (under the control of the coil R–3), R–4a (under the control of the coil R–4) and R–5a (under the control of the coil R–5). The contactors are mounted in the usual casing (unnecessary to illustrate) and which may be attached to an appropriate part of the frame of the press or the stand S. The wiring system also includes three limit switches which, in the several diagrams, are distinguished as LS–1, LS–2 and LS–3. The limit switches are of the usual construction, one of them (which may be any one) being shown in elevation in Figure 21. Each limit switch includes a resilient arm 95 which tends to spring outward from the switch casing 96 and carries a terminal roller 97. Each arm 95 bears upon an outwardly spring biased button 98 which controls the switch elements mounted within the casing 96. The limit switch LS–1 is mounted upon an upward extension 99 (Figure 23) of the bracket 45 and its arm 95 is engaged by the rear edge face of the table 3 (Figure 22) as the table nears the end of its movement from position N to position P—I. The limit switch LS–2 is mounted upon the part 54 of the bracket 45 and its arm 95 is engaged by the bar 43 when the rails 4 are near the end of their retractile movement. The limit switch LS–3 is mounted upon the upward extension 89 (Figures 17 and 18) of a front arm 87 and its arm 95 is engaged by the front edge face of the table 3 as the table nears the limit of its movement to position N.

In the several wiring diagrams the line wires are designated as 100 and 101, the wire 101 being assumed as the return wire.

Figure 25 shows the circuits for the operation of the motor 82 to effect the movement of the table 3 from position N to position P—I. The switch A being normally open, these circuits are operative when the button of switch A is pushed inward, one of the circuits being an initiating circuit for the energization of the coil R–1 and a second circuit, in shunt with the initiating circuit, being a holding circuit which includes the coil R–1 and remains closed when the button of switch A is released and returns to its normal disengaged position. The circuits through the coil R–1 control the closure and breaking of the first operating circuit of the motor 82. The initiating circuit is traced as follows: wires 100 and 102, coil R–1, wire 103, switch A, wires 104 and 105, switch C and wire 106 to return wire 101. Upon the closure of the initiating circuit the coil R–1 effects the engagement of the contacts R–1a with the result of the closure of the holding circuit which is traced as follows: wires 100 and 102, coil R–1, wires 103 and 107, contacts R–1a, wire 108, switch LS–1 in its first or normally maintained position, wires 109 and 105, switch C and wire 106 to return wire 101. The initiating and holding circuits of the coil R–1 control the first operating circuit of the motor 82 through contacts R–1b which are normally disengaged and are moved into engagement by the energized coil R–1, their engagement closing the circuit of the motor 82 to effect the movement of the table 3 from position N to position P—I. This motor circuit which is in shunt with the holding circuit is traced as follows: wires 100 and 110, motor 82, wire 111, contacts R–1b, and wire 112 to return wire 101. When the table 3 nears the end of its movement to position P—I it engages the arm 95 of the switch LS–1 and moves the switch to its second position, the switch in such movement breaking the holding circuit with resultant deenergization of the coil R–1 in consequence of which the contacts R–1a and R–1b return to their normal disengaged relation and the operating circuit for the motor is broken at the contacts R–1b.

When the table, moving from its position N, reaches its position P—I the rails 4 are in their retracted position and hold the limit switch LS–2 in a normal position in which it is included in the circuit for the energization of the solenoid 57 by means of which the valve 56 is positioned for the delivery of air into the rear end of the casing 47 with resultant advancing movement of the rails 4 to effect the lowering of the table 3 from its position P—I to its position P—O. The switch LS–1 as moved by the table 3 from its normal position to its second position, in addition to breaking the circuit of the motor as shown in Figure 25 and as above explained, also completes the circuits for the energization of the solenoid 57. These are shown in Figure 26 and include a maintaining circuit for the energization of the coil R–2 which controls the circuit for the energization of the solenoid 57. The maintaining circuit is as follows: wires 100 and 113, coil R–2, wire 114, switch LS–2 in the position in which it is normally maintained by the bar 43, wire 115, switch LS–1 in its second position to which it was moved by the table 3, wires 116, 117 and 105, switch C and wire 106 to return wire 101. The energization of the coil R–2 effects the engagement of the contacts R–2a, thereby closing the circuit of the solenoid 57, this circuit being traced as follows: wires 100 and 118, solenoid 57, wire 119, contacts R–2a and wire 120 to return wire 101.

When the rails 4 have completed their advancing movement with resultant lowering of the table 3 the bar 43 releases the switch LS–2 which thereupon moves to a second position and in such movement breaks the circuit of the coil R–2 with resultant breaking of the circuit of the solenoid 57.

With the table 3 in its lowered position the press is operated to process the material after which the platens are restored to their normal relation, the next steps in the movement of the table being under the control of the push button switch B and involving sequentially the movements of the table 3 from position P—O to position P—I and from position P—I to position N.

When the switch LS-2 moves to its second position it engages contacts included in the circuit of the coil R-3 and thereby conditions this circuit for closure by the push button switch B. The coil R-3 as energized by the closure of the switch B causes the engagement of contacts which are included in a circuit for maintaining the energization of the coil R-3 when the button of the switch B is released. The coil R-3 also causes the engagement of contacts which are included in the circuit of the solenoid 58 whereupon, the solenoid being energized, the valve 56 is positioned for the delivery of air into the front end of the casing 47 with resultant retractile movement of the rails 4 to effect the raising of the table from its position P—O to its position P—I. The circuit of the solenoid 58 is automatically broken when the table 3 reaches its position P—I.

The circuits involved in the energization of the solenoid 58 are shown in Figure 27. The initiating circuit includes the coil R-3 and the switch B. The maintaining circuit includes the coil R-3 and the contacts R-3a. The solenoid circuit includes the contacts R-3b. The initiating circuit is as follows: wires 100 and 121, coil R-3, wire 122, switch LS-2 in its second position, wires 123 and 124, switch B, wires 125, 126, 117 and 105, switch C and wire 106 to return wire 101. The maintaining circuit is as follows: wires 100 and 121, coil R-3, wire 122, switch LS-2 in its second position, wires 123 and 127, contacts R-3a, wires 128, 126, 117 and 105, switch C and wire 106 to return wire 101. The solenoid circuit is as follows: wires 100 and 129, solenoid 58, wire 130, contacts R-3b and wire 131 to return wire 101. The closure of the switch B immediately establishes the holding circuit and the solenoid circuit.

At the completion of the retractile movement of the rails 4, at which time the table 3 is in its position P—I, the bar 43 returns the switch LS-2 to its original position in which it is normally maintained and this movement of the switch LS-2 breaks the circuit of the coil R-3 with resultant deenergization of the coil, disengagement of the contacts R-3b and the breaking of the circuit of the solenoid 58.

Immediately upon the deenergization of the solenoid 58 circuits are established for effecting the operation of the motor 82 in the direction in which it moves the table 3 from its position P—I to its position N. These circuits, which are shown in detail in Figure 28, are conditioned and, therefore, controlled by the coil R-3. The immediate circuit for this operation of the motor 82 includes a coil R-4 which is maintained deenergized during the period of energization of the solenoid 58 and which is energized immediately that the table 3 completes its movement from its position P—O to its position P—I, the closure of the circuit of the coil R-4 being under the control of the coil R-5 which is energized at the same time that the coil R-3 is energized, that is to say upon the closure of the switch B. The circuit of the coil R-4 includes a pair of normally engaged contacts R-3c under the control of the coil R-3 and which are disengaged when the coil R-3 is energized, thereby to prevent the closure of the circuit of the coil R-4 during the period of energization of the solenoid 58 and also includes contacts R-5a under the control of its coil R-5. The coil R-5 is in two circuits which may be called energizing circuits and effect the energization of the coil R-4 upon the deenergization of the coil R-3, one of the circuit of the coil R-5 being an initiating circuit tied in with the holding circuit of the coil R-3 through the contacts R-3a and the other being a holding circuit through the contacts R-5a which are engaged upon the energization of the coil R-5, the latter holding circuit maintaining the coil R-5 energized after the coil R-3 is deenergized with resultant breaking of the initiating circuit at the contacts R-3a and throughout the period of the movement of the table 3 from its position P—I to its position N. When the coil R-3 is deenergized the contacts R-3c return to their normally engaged relation and thereupon the circuit of the coil R-4 is closed. The energization of the coil R-4 effects the engagement of the contacts R-4a which are in the immediate circuit of the motor 82 and thereby effects the closure of that circuit of the motor 82 required for the movement of the table 3 from its position P—I to its position N.

The initiating energizing circuit of the coil R-5 is as follows: wires 100 and 132, coil R-5, wires 133, 134 and 127, contacts R-3a, wires 128, 126, 117 and 105, switch C and wire 106 to return wire 101. The holding energizing circuit of the coil R-5 is as follows: wires 100 and 132, coil R-5, wires 133, 135 and 136, contacts R-5a, wire 137, limit switch LS-3, wires 138, 126, 117 and 105, switch C and wire 106 to return wire 101.

When the coil R-3 is deenergized the contacts R-3c resume their normally engaged relation and the circuit of the coil R-4 is closed, this circuit being as follows: wires 100 and 139, coil R-4, wire 140, contacts R-3c, wires 141 and 136, contacts R-5a, wire 137, switch LS-3, wires 138, 126, 117 and 105, switch C and wire 106 to return wire 101. The energization of the coil R-4 effects the engagement of the contacts R-4a and thereby completes the circuit of the motor 82, this circuit being as follows: wires 100 and 110, motor 82, wire 142, contacts R-4a and wire 143 to return wire 100.

When the table 3 nears the end of its movement to position N it engages the arm 95 of the switch LS-3 and moves the switch to open position as shown in the diagram of Figure 29. Since the circuits of the coils R-5 and R-4 in each instance include the switch LS-3 as normally closed the movement of this switch to open position breaks these circuits and by the resultant deenergization of the coil R-4 and the movements of the contacts R-4a to disengaged relation the circuit of the motor 82 is broken at the contacts R-4a. Since the circuits of the coils R-1, R-2 and R-3 were previously broken it follows that when the switch LS-3 is moved to open position at the completion of the movement of the table 3 to position N all circuits are broken and the table remains stationary in position N during the operations of removing the processed subject and loading the subject to be processed. When the table 3 has been loaded the cycle of operations is repeated, that is to say the push button switch A is closed with resultant sequential movements of the table from its position N to its position P—I and from its position P—I to its position P—O, all as shown in Figures 25 and 26 and as explained in the foregoing description, and, the processing operation having been completed meantime, the push button switch B is thereupon closed and the table sequentially moved to its positions P—I and N. At the beginning of the return movement of the table from its position N the switch LS-3 is released and returns to its closed position in which it remains until it is again engaged by the table in its succeeding movement to its position N.

It will be noted that the several controlling circuits as shown in Figures 25, 26, 27 and 28 include the wires 105 and 106 which, in functional effect, are a single common wire. It follows that all controlling circuits may be broken along this functionally single wire. Hence instead of a physical single wire, physically separate wires 105 and 106 are provided with a normally closed switch C interposed between them for emergency actuation to break the controlling circuits as unforeseen hazards may require. When the button of the switch C is pushed to open the switch the controlling circuit which is closed at the time, whatever that circuit may be, is broken with the result that all circuits are broken, and the movement of the table 3 at that time, whatever that movement may be, is instantly arrested. The button of the switch C having been pressed to break the contemporaneous controlling circuit the switch C resumes its normal circuit closing position when its button is released but such resumption of the circuit closing position of the switch C does not reestablish the controlling circuit. For this purpose, and in order that the movement of the table may be resumed, it is necessary to close either of the switches A or B according to the particular movement of the table which was in progress at the time the controlling circuit was broken by the operation of the switch C.

In résumé of the circuit operations involved and the relations of the circuits to one another (without reference to the contactors) and assuming that the starting position of the table is its position N and that the cycle of movements of the table is completed upon the return of the table to its position N:

The first movement of the table from its position N to its position P—I (Figure 25) and is effected by the motor 82, the motor circuit for this movement being closed through the push button switch A and through the switch LS–1 in its first or normal position which it occupies except when the table 3 is in its position P—I. The switch LS–1 has a second position to which it is moved by the table when the table reaches its position P—I. In its second position the switch LS–1 breaks the motor circuit and closes the circuit through the solenoid 57.

The circuit of the solenoid 57 (Figure 26) is otherwise closed by the switch LS–2 which is held in circuit closing position by the rails 4 as retracted when the table reaches its position P—I from its position N. The rails 4, being thereupon moved to their advanced position by the solenoid 57 as energized, effect the second movement of the table 3 which is from its position P—I to its position P—O. The rails 4 upon reaching their advanced position also effect a movement of the switch LS–2 to a second position in which it breaks the circuit of the solenoid 57. Thereupon, the table remaining in its position P—O, the subject is processed by the press.

In its second position, as effected by the rails 4 in their advanced position, the switch LS–2 is in a maintaining circuit (Figure 27) which effects the closure of the circuit of the solenoid 58, the maintaining circuit, however, being open at the push button switch B. When the processing operation has been completed and the platens are restored to their normal relation the switch B is manually closed with resultant closure of the maintaining circuit and of the circuit of the solenoid 58 under the control of the maintaining circuit. The solenoid 58 being thereupon energized the rails 4 are moved back to their retracted position in which they effect the third movement of the table which is from its position P—O to its position P—I. At the completion of their retractile movement the rails 4 also return the switch LS–2 to its first or initial position, thereby to break the maintaining circuit and the circuit of the solenoid 58.

The fourth movement of the table 3 is from its position P—I to its position N and is effected by the motor 82, the circuit of which is closed automatically at the time when (the table 3 having reached its position P—I from its position P—O) the solenoid 58 is deenergized. It will be noted that whereas when the switch A is closed the energization of the solenoid 57 follows the operation of the motor when the switch B is closed the operations are in reverse order, that is to say the operation of the motor follows the energization of the solenoid 58.

The maintaining circuit (Figure 27) which includes the switch LS–2 in its second position is also utilized for the disengagement of normally engaged contacts R–3c (Figure 28) in a controlling circuit which when closed effects the closure of a second operating circuit of the motor 82 with a resultant fourth movement of the table 3, the controlling circuit being broken at the disengaged contacts R–3c (to prevent the closure of the second motor operating circuit) during the period when the solenoid 58 is energized and being completed only when the solenoid 58 is deenergized and the contacts R–3c are restored to their normally engaged relation.

The closure of the controlling circuit requires an energizing circuit which is closed contemporaneously with the energization of the solenoid 58 and effects the engagement of the normally disengaged contacts R–5a which are included in the controlling circuit, the energizing circuit also including these contacts. With the energizing circuit effective to cause the engagement of the contacts R–5a the closure of the controlling circuit is completed through the contacts R–3c upon the deenergization of the solenoid 58. The controlling circuit effects the engagement of the contacts R–4a by which the second motor operating circuit is closed. Both the controlling circuit and the energizing circuit are closed through the switch LS–3 and remain closed during the fourth movement of the table 3 at the completion of which the table 3 moves the switch LS–3 to its circuit breaking position (Figure 29). With the controlling circuit and the second motor operating circuit thus broken the table 3 remains at rest in its position N for the period required for the removal of the processed subject and the loading of the subject to be processed. Thereupon the operator closes the switch A and the cycle of operations is repeated.

I claim:

1. For use with a press having a lower platen, a plate mounted thereon, a transfer table which supports the subject to be processed, the table having a first position above and in spaced relation to the plate, a second position upon the plate and in which it is supported by the plate with its lower face in uniform contact with the upper face of the plate, and a third position at one side of the plate to which it is movable from its first position and in which it may be loaded or unloaded, and a stand at one side of the platen for the support of the table in its third position, a mechanism for effecting the movements of the transfer table between its first and second positions comprising, in combination: two pairs of rails in alining relation, the rails of the first pair being supported adjacent the platen for simultaneous horizontal movements in planar relation between a normal retracted position in which they support the table in its first position and an advanced position in which the table is in its second position, and the rails of the second pair being stationary and parts of the stand, carriages in front and rear pairs attached to the table adjacent its front and rear ends and having supporting engagement with the rails, the carriages being movable along the rails and in their movements effecting movements of the table between its first and third positions, the rails of the first pair being movable when the table is in either of its first or second positions and being formed for cooperation in their movements with the carriages to effect rectilinear vertical movements of the table between these positions, the direction of the rectilinear vertical movement of the table being in accordance with the direction of horizontal movement of the rails of the first pair.

2. Mechanism as set forth in claim 1 wherein the carriages are provided with rollers which track upon the rails of the two pairs and the rails of the first pair are provided in their upper faces with front and rear recesses for cooperation respectively with the rollers of the front and rear carriages, the recesses having inclined cam surfaces which extend downward from the upper faces of the rails and by engagement with the rollers of the corresponding pair of carriages effect the rectilinear vertical movements of the table, the downward extent of the cam surfaces of the several recesses being in the same direction.

3. Mechanism as set forth in claim 1 wherein the carriages are provided with rollers which track upon the rails of the two pairs, the rails of the first pair are provided in their upper faces with front and rear recesses for cooperation with the front and rear carriages, and the carriages are provided at their outer sides with downwardly extending flanges adjacent the outer side faces of the rails and which hold the table against lateral displacement, the recesses having inclined cam surfaces which extend downward from the upper faces of the rails and by engagement with the rollers of the corresponding pair of carriages effect the rectilinear vertical movements of the table, the downward extent of the cam surfaces of the several recesses being in the same direction.

4. Mechanism as set forth in claim 1 wherein the platen has portions which project laterally beyond the plate and the rails of the first pair are adjacent the sides of the plate and have rollers which track upon the projecting portions of the platen.

5. Mechanism as set forth in claim 3 wherein the rails of the second pair are provided at their remote ends with terminal stops which are engaged by the downwardly extending flanges when the table reaches its second position.

6. Mechanism as set forth in claim 1 wherein the platen has portions which project laterally beyond the plate, the rails of the first pair are adjacent the platen and the sides of the plate and have rollers which track upon the projecting portions of the platen, the carriages are provided with rollers which track upon the rails of the two pairs, and the rails of the first pair are provided in their upper faces with front and rear recesses for cooperation respectively with the rollers of the front and rear carriages, the recesses having inclined cam surfaces which extend downward from the upper faces of the rails and by engagement with the rollers of the corresponding pair of carriages effect the rectilinear vertical movements of the table, the downward extent of the cam surfaces of the several recesses being in the same direction.

7. Mechanism as set forth in claim 2 wherein the carriages of the rear pair are each provided with a pair of rollers so spaced that in the movement of such carriages over the front recesses the carriages will at all times be supported upon the upper faces of the rails of the first pair.

8. For use with a press having a lower platen, a plate mounted thereon, a transfer table which supports the subject to be processed, the table having a first position above and in spaced relation to the plate, a second position upon the plate with its lower face in uniform contact with the upper face of the plate, and a third position at one side of the plate to which it is movable from its first position and in which it may be loaded or unloaded, and a stand at the side of the platen for the support of the table in its third position, a mechanism for effecting the movements of the transfer table between its first and second positions and between its first and third positions comprising, in combination: two pairs of rails in alining relation, the rails of the first pair being supported adjacent the platen for horizontal movement in planar relation between a normal position and an advanced position and the rails of the second pair being parts of the stand, carriages in front and rear pairs attached to the table at its front and rear ends and having supporting engagement with the rails, the carriages being movable along the rails to effect the movements of the table between its first and third positions, a handle including a cross bar, the handle being connected to the table for movement between upper and lower positions and in one position being available to effect movement of the table between its first and third positions, and companion elements associated with the handle and with the rails of the first pair for cooperation in the movements of the handle between its two positions; and according to the direction of such movement, to move the rails of the first pair from their normal position to their advanced position or from their advanced position back to their normal position, the rails of the first pair being formed for cooperation with the carriages in their movements between their normal and advanced positions to effect rectilinear vertical movement of the table between its first and second positions, the direction of the rectilinear movement of the table being in accordance with the direction of horizontal movement of the rails of the first pair.

9. Mechanism as set forth in claim 8 wherein the movement of the handle between its upper and lower positions is pivotal and the handle includes arms which carry the cross bar and are pivotally connected to the carriages of the front pair and the companion elements consist of angularly directed extensions of the arms located beyond the pivotal connections of the arms and bifurcated to provide a cam recess and front and rear tines and rollers carried by the rails of the first pair and mounted adjacent corresponding ends thereof for engagement in the cam recesses of the extensions and between the tines at the time when the carriage is in its first position, the handle in its lower position being available by a direct pulling or pushing action to move the table between its first and third positions and being available in its pivotal movements between its lower and upper positions and through the cooperation of the companion elements to effect the movements in planar relation of the rails of the first pair.

10. Mechanism as set forth in claim 9 wherein the carriages are provided with rollers which track upon the rails of the two pairs and the rails of the first pair are provided in their upper faces with front and rear recesses for cooperation respectively with the front and rear carriages, the recesses having inclined cam surfaces which extend downward from the upper faces of the rails and by engagement with the rollers of the corresponding pair of carriages effect the rectilinear vertical movements of the table, the downward extent of the cam surfaces of the several recesses being in the same direction.

11. Mechanism as set forth in claim 8 wherein the adjacent end portions of the rails of the two pairs are of reduced thickness, are in overlapping relation and are formed with means functioning as stops positively to limit the movements of the rails of the first pair in either direction.

12. Mechanism as set forth in claim 1 wherein the rails of the first pair are connected at their rear ends by a cross bar and means is provided for effecting the movements of the rails as connected by the cross bar between their retracted and advanced positions.

13. In a press, in combination: a platen, a plate normally supported by said platen, a transfer table having three positions consisting of a positive operative position in which said transfer table rests on said plate, a positive inoperative position in which said transfer table is supported above and away from said plate and a negative position in which said transfer table is at one side of said plate, a stand at one side of the press for the support of the transfer table in its negative position, wheeled carriages carried by the transfer table, a first pair of rails adjacent the plate for cooperation with the carriages, the rails being movable in either direction of their length, a second pair of rails carried by the stand in alinement with the rails first named, the rails of the first pair being formed, in accordance with the direction of their movements, for cooperation with the carriages to move the transfer table between its positive operative and its positive inoperative positions in a path normal to the surfaces of the transfer table and the plate, means for effecting the movements of the rails of the first pair, and means for moving said transfer table between its positive inoperative position and its negative position in a path of translation parallel to the surfaces of said transfer table and said plate, said means for moving said transfer table including a reversible motor means operatively connected to the transfer table and also operatively connected in a network of switching means including a manually operated push button starting switch and limit switches operated by said transfer table at the limits of each said movement thereof.

14. In a press, in combination: a platen, a plate normally supported by said platen, a transfer table having three positions consisting of a positive operative position in which said transfer table rests on said plate, a positive inoperative position in which said transfer table is supported above and away from said plate and a negative position in which said transfer table is at one side of said plate, a stand at one side of the press for the support of the transfer table in its negative position, wheeled carriages carried by the transfer table, a first pair of rails adjacent the plate for cooperation with the carriages, the rails being movable in either direction of their length, a second pair of rails carried by the stand in alinement with the rails first named, the rails of the first pair being formed, in accordance with the direction of their movements, for cooperation with the carriages to move the transfer table between its positive operative and its positive inoperative positions in a path normal to the surfaces of the transfer table and the plate, means for effecting the movements of the rails of the first pair, and means for moving said transfer table between its positive inoperative position and its negative position in a path of translation parallel to the surfaces of said transfer table and said plate, said means for moving said table between its positive inoperative and negative positions including a reversible electric motor, and said means for moving said table between its positive operative and positive inoperative positions including a cylinder and an enclosed piston relatively movable in opposite directions under air pressure delivered to either end of the cylinder, a valve movable in opposite directions for controlling the admission of air to either end of the cylinder and opposed solenoids for moving said valve, said electric motor and said solenoids being connected in a network of switch means including a manually operated push button starting switch for each direction of movement of said table and limit switches operated by said table at the limits of each movement thereof.

References Cited in the file of this patent

UNITED STATES PATENTS

| 943,504 | Williams | Dec. 4, 1909 |
| 1,591,093 | Madden | July 6, 1926 |
| 2,728,468 | Siempelkamp | Dec. 27, 1955 |

FOREIGN PATENTS

| 321,574 | Italy | Oct. 9, 1934 |